(12) United States Patent
Jackson

(10) Patent No.: US 6,896,269 B2
(45) Date of Patent: May 24, 2005

(54) REVERSE PRESSURE ACTUATED SEAL

(75) Inventor: Donald S. Jackson, Pekin, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/988,625

(22) Filed: Nov. 20, 2001

(65) Prior Publication Data

US 2003/0094765 A1 May 22, 2003

(51) Int. Cl.⁷ ................................................ F16J 15/32
(52) U.S. Cl. ........................ 277/544; 277/552; 277/558
(58) Field of Search ................................. 277/459, 447, 277/463–465, 544, 553, 558, 549, 579, 926, 928, 559, 552

(56) References Cited

U.S. PATENT DOCUMENTS

| 2,054,863 | A | * | 9/1936 | Oliver | ......................... | 60/586 |
| 2,196,337 | A | | 4/1940 | Loweke | | |
| 2,226,273 | A | | 12/1940 | Westefeldt | | |
| 2,349,346 | A | * | 5/1944 | Goepfrich | ..................... | 60/588 |
| 2,884,291 | A | | 4/1959 | Whitten | | |
| 3,033,578 | A | | 5/1962 | Kellogg | | |
| 3,858,950 | A | | 1/1975 | Otto | | |
| 3,940,938 | A | | 3/1976 | Durham et al. | | |
| 4,089,534 | A | | 5/1978 | Litherland | | |
| 4,284,280 | A | * | 8/1981 | Bertram et al. | ............. | 277/558 |
| 5,127,661 | A | * | 7/1992 | Franson et al. | ............. | 277/552 |
| 5,169,162 | A | * | 12/1992 | Azaml et al. | ................ | 277/465 |
| 5,328,178 | A | * | 7/1994 | Nies | ........................... | 277/438 |
| 5,524,904 | A | * | 6/1996 | Willi et al. | .................. | 277/552 |
| 6,113,108 | A | * | 9/2000 | Friend et al. | ................ | 277/549 |
| 6,129,358 | A | * | 10/2000 | Kiesel et al. | ................ | 277/436 |
| 6,205,908 | B1 | * | 3/2001 | Kumai et al. | .................. | 92/160 |
| 6,290,235 | B1 | * | 9/2001 | Albertson | .................... | 277/510 |
| 6,439,578 | B1 | * | 8/2002 | Radcliffe | ..................... | 277/489 |

* cited by examiner

Primary Examiner—Heather Shackelford
Assistant Examiner—Michael J. Kyle
(74) Attorney, Agent, or Firm—Finnegan, Henderson, Farabow, Garrett & Dunner

(57) ABSTRACT

A seal for a hydraulic cylinder rod is provided. The seal includes a main body that defines an opening therein. The seal includes an inner surface and an outer surface. A first radial face having a generally planar surface extends from the inner surface to the outer surface. A second radial face having a groove disposed therein also extends from the inner surface to the outer surface. The groove defines an inner lip adjacent the inner surface and an outer lip adjacent the outer surface. The seal also includes a relief feature in the outer surface of the main body. The relief feature extends from the first radial face towards the second radial face.

10 Claims, 3 Drawing Sheets

REVERSE PRESSURE ACTUATED SEAL

TECHNICAL FIELD

The present invention is directed to a sealing assembly for a hydraulic cylinder. In particular, the present invention is directed to a sealing assembly that includes a reverse pressure actuated seal having a relief feature.

BACKGROUND

Many work machines, such as tractors, excavators, loaders, and other earth moving equipment, utilize hydraulic actuators to generate the force required to accomplish their tasks. These hydraulic actuators, which include, for example, hydraulic cylinders and fluid motors, typically include two fluid chambers disposed on opposite sides of a moveable element. Pressurized fluid is introduced into one of the fluid chambers, which causes the moveable element to move relative to the hydraulic actuator housing.

The moveable element is usually connected to a work implement on the work machine through a rod or shaft. Typically, each hydraulic actuator includes a sealing arrangement that engages the rod or shaft to prevent the pressurized fluid from leaking from the fluid chambers of the hydraulic actuator during use. One such sealing arrangement for a hydraulic cylinder is described in U.S. Pat. No. 6,129,358, which describes a unidirectional rod sealing ring adapted to form a sealed condition.

A sealing arrangement for a hydraulic cylinder may include a series of three seals that are disposed in the cylinder head to engage the shaft proximate exit point of the shaft. The cylinder head typically includes a series of annular grooves, or counter bores, that are configured to receive each of the three seals. The first seal, which is placed closest to the pressurized fluid, is known as a buffer seal. The buffer seal forms a high pressure seal with the shaft to prevent the pressurized fluid from escaping the hydraulic cylinder. Due to the high operating pressures of the hydraulic cylinders, however, some of the pressurized fluid will leak through the buffer seal.

The second seal, which is placed on the opposite side of the buffer seal from the fluid chamber is known as a "U-cup" seal. This seal typically has a notch or groove that forms a "U" shape. This seal provides a second seal to prevent the fluid that has leaked through the buffer seal from escaping the hydraulic cylinder. This fluid is captured in a gap between the buffer seal and the "U-cup" seal and in the notch or groove in the seal. When operating conditions permit, the buffer seal allows the captured fluid to bypass the buffer seal and return to the system.

The third seal, or the outermost seal, is known as a wiper seal. This seal prevents dirt or debris from entering the system and contaminating the fluid. The wiper seal also wipes any remaining fluid from the surface of the shaft. The fluid removed from the surface of the shaft is collected in a gap between the "U-cup" seal and the wiper seal. As additional fluid is captured between these seals, the pressure of the fluid between the seals will continue to build. If the fluid pressure becomes great enough, the force of the pressure may cause the wiper seal to dislodge from its annular groove in the cylinder head. When the wiper seal is dislodged, the cylinder loses its protection from contaminating elements, such as dirt and debris.

The reverse pressure actuated seal and sealing assembly of the present invention is directed to solving all or some of the problems set forth above.

SUMMARY OF THE INVENTION

To attain the advantages and in accordance with the purposes of the invention, as embodied and broadly described herein, the invention is directed to a seal for a hydraulic cylinder rod. The seal includes a main body that defines an opening therein. The main body includes an inner surface and an outer surface. A first radial face that has a generally planar surface extends from the inner surface to the outer surface. A second radial face extends from the inner surface to the outer surface and has a groove that defines an inner lip adjacent the inner surface and an outer lip adjacent the outer surface. A relief feature is disposed in the outer surface of the main body and extends from the first radial face towards the second radial face.

According to another aspect, the present invention is directed to a hydraulic cylinder assembly that includes a housing that defines at least one chamber configured to hold a pressurized fluid and has a head that defines an opening. A cylinder rod that has a surface is disposed for sliding movement in the opening of the housing. A first seal engages the surface of the cylinder rod to prevent the pressurized fluid from leaking from the at least one chamber. The cylinder assembly also includes a second seal having a main body that defines an opening configured to receive the cylinder rod therein. The main body includes an inner surface and an outer surface. A first radial face having a generally planar surface extends from the inner surface to the outer surface. A second radial face extends from the inner surface to the outer surface and has a groove that defines an inner lip adjacent the inner surface and an outer lip adjacent the outer surface. The inner lip engages the surface of the cylinder rod at a location such that the first seal is disposed between the at least one chamber and the second seal. The main body further includes a relief feature that is disposed in the outer surface and extends from the first radial face towards the second radial face. A third seal engages the surface of the cylinder rod at a location such that both the first and second seals are disposed between the at least one chamber and the third seal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings.

DETAILED DESCRIPTION

Reference will now be made in detail to an embodiment of the present invention, an example of which is illustrated in the accompanying drawings. Wherever possible, the same reference numbers will be used throughout the drawings to refer to the same or like parts.

As illustrated in the accompanying drawings, a seal for a hydraulic cylinder rod is provided. As described in greater detail below, the seal is reverse pressure actuated and includes a relief feature. An exemplary embodiment of a reverse pressure actuated seal is illustrated in FIG. 1 and is generally designated by the reference number 10.

Figure 1:
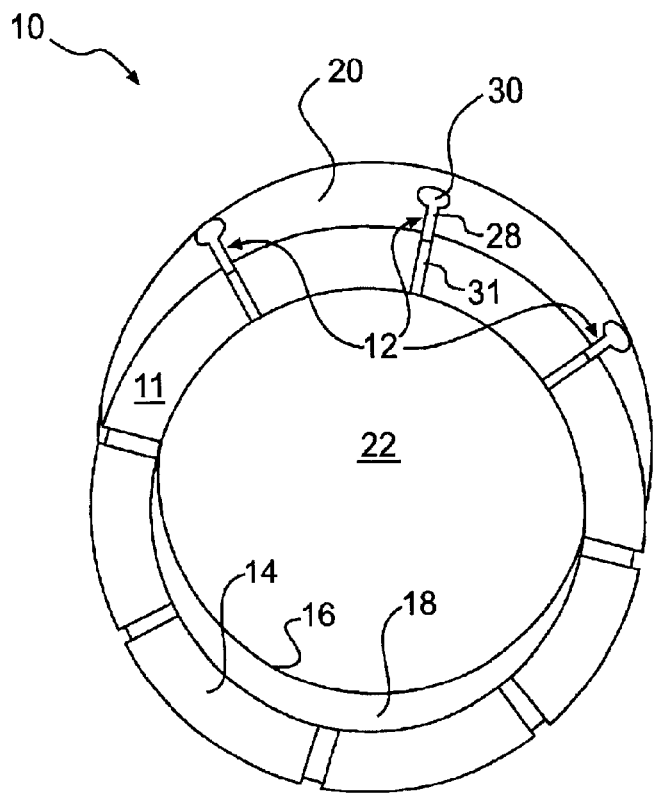
FIG. 1 is a perspective view of a reverse pressure actuated seal according to an embodiment of the present invention.

As shown in FIG. 1, seal 10 includes a main body 11 that defines an opening 22. Main body 11 includes an inner surface 18 that delimits the periphery of opening 22 and an outer surface 20 that extends along the perimeter of main body 11. In this illustrative embodiment, main 11 body is constructed of a resilient material, such as, for example, an elastomeric substance.

Main body 11 also includes a first radial 14 face and a second radial face 16. First and second radial faces 14, 16 are disposed on opposite sides of main body 11 and extend from inner surface 18 to outer surface 20. First radial face 14 has a generally planar surface.

Figure 2:
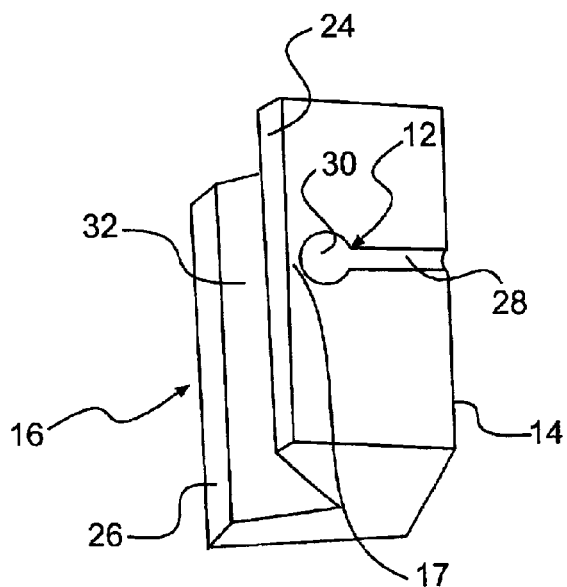
FIG. 2 is a partial perspective view of a reverse pressure actuated seal having a relief feature in accordance with an embodiment of the present invention.

As illustrated in FIG. 2, second radial face 16 includes a groove 32. Groove 32 divides second radial face 16 into a outer lip 24 proximate outer surface 20 and an inner lip 26 proximate inner surface 18. In the illustrated embodiment, groove 32 forms a "V" shaped channel in second radial face 16. It is contemplated, however, that groove 32 may form other shapes, such as, for example, a rounded channel or a "U" shaped channel.

Figure 3:
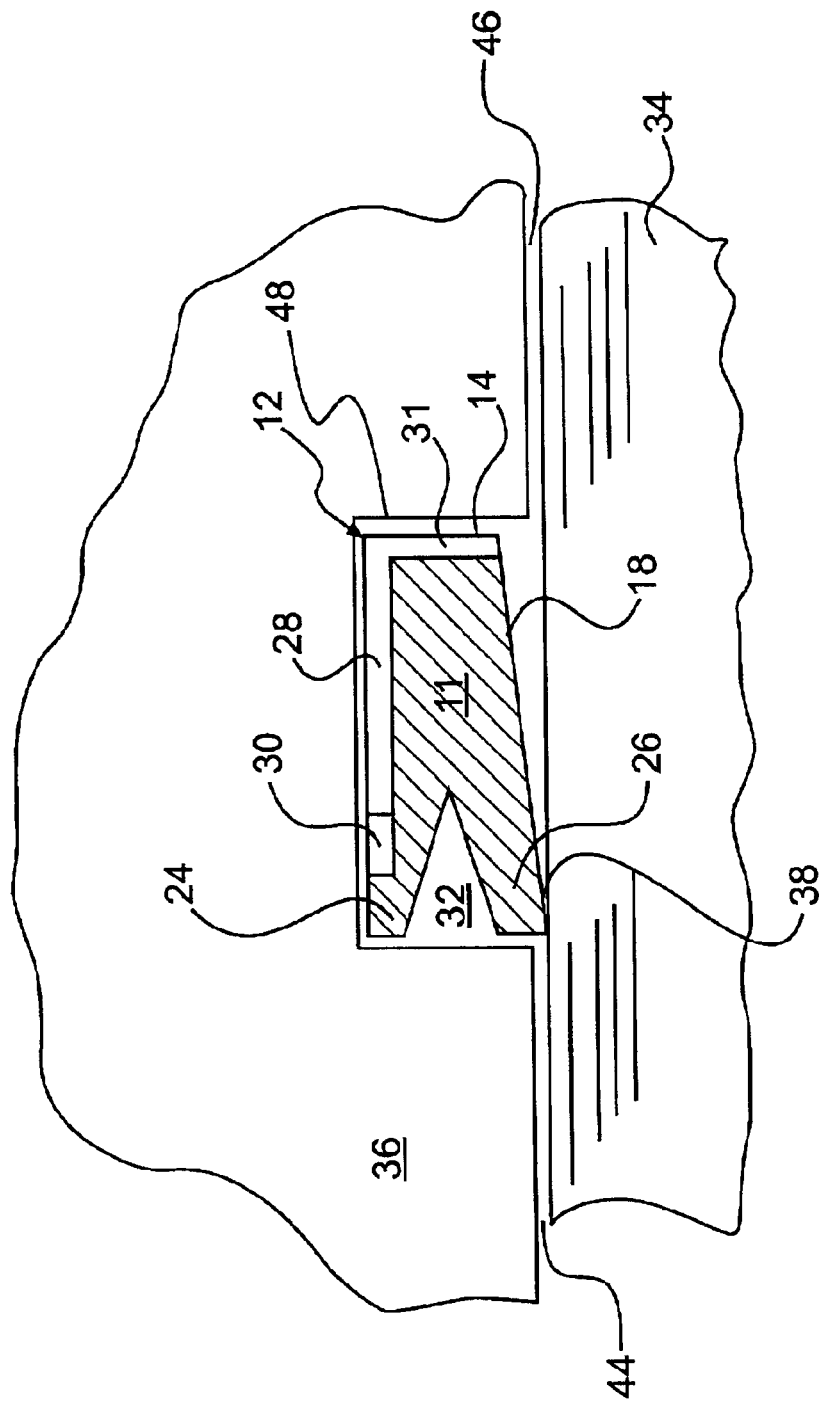
FIG. 3 is cross-sectional view of a seal according to an embodiment of the present invention illustrating the seal engaged with a hydraulic cylinder shaft.

As illustrated in FIGS. 1–3, seal includes a relief feature 12. Relief feature 12 is a channel or notch that is formed in outer surface 20 of main body 11. Relief feature 12 extends from first radial face 14 towards second radial face 16. A ridge 17 of material separates relief feature 12 from second radial face 16.

In the illustrated embodiment, relief feature 12 includes a channel 28 connected to a recess 30. As shown, recess 30 is circular, although it is contemplated that recess 30 may have any of a variety of other shapes, such as, for example, a square, an oval, an ellipse, or a triangle. It is further contemplated that relief feature 12 may include a pair of intersecting channels, such as forming a "T" shape, or that relief feature 12 may be an extended channel having a constant or varying width along the length of the extended channel.

As illustrated in FIG. 1, a second channel 31 may be formed in first radial face 14. Second channel 31 extends along first radial face 14 from inner surface 18 to outer surface 20. Second channel 31 connects with channel 28 to form a continuous groove that extends along the first radial face 14 from inner surface 18 to ridge 17 in outer surface 20.

As shown in FIG. 1, a plurality of relief features 12 are disposed along outer surface 20 of seal 10. In the illustrated embodiment, seal 10 includes eight relief features 12 that are equally distributed around the perimeter of main body 11. It is contemplated, however, that seal 10 may have a greater or smaller number of relief features 12, depending upon the intended application. It is further contemplated that such relief features need not be equally spaced.

As shown in FIG. 3, seal 10 is received within an annular groove 48, or counter bore, in a housing 36 that receives a shaft 34. When seal 10 is received within annular groove 48, shaft 34 is inserted through opening 22. Shaft 34 may slide or rotate relative to housing 36. It will be recognized that the size and shape of opening 22 will be determined, at least in part, by the size and shape of shaft 34.

A contact portion 38 of inner lip 26 contacts the surface of shaft 34. The engagement of contact portion 38 with the surface of shaft 34 forms a seal with the surface of shaft 34. Contact portion 38 of inner lip 26 remains in contact with the surface of shaft 34 as shaft 34 slides or rotates relative to housing 36.

As illustrated in FIG. 3, annular groove 48 is configured to securely hold seal 10 to prevent seal from moving along with shaft 34. Main body 11 and annular groove 48 are sized such that each of first radial face 14, outer surface 20, and second radial face 16 engage a corresponding portion of annular groove 48. The engagement of seal 10 with annular groove 48 and shaft 34 forms a seal that acts to prevent fluid from flowing along the surface of shaft 34.

When seal 10 is positioned in annular groove 48, channels 28 and 31 combine to form a passageway between main body 11 and the surface of annular groove 48. In the illustrated embodiment, this passageway extends along first radial face 14 from inner surface 18 to recess 30 in outer surface 20. As described in greater detail below, fluid trapped behind seal 10 flows through this passageway to reach relief feature 12.

Figure 4:
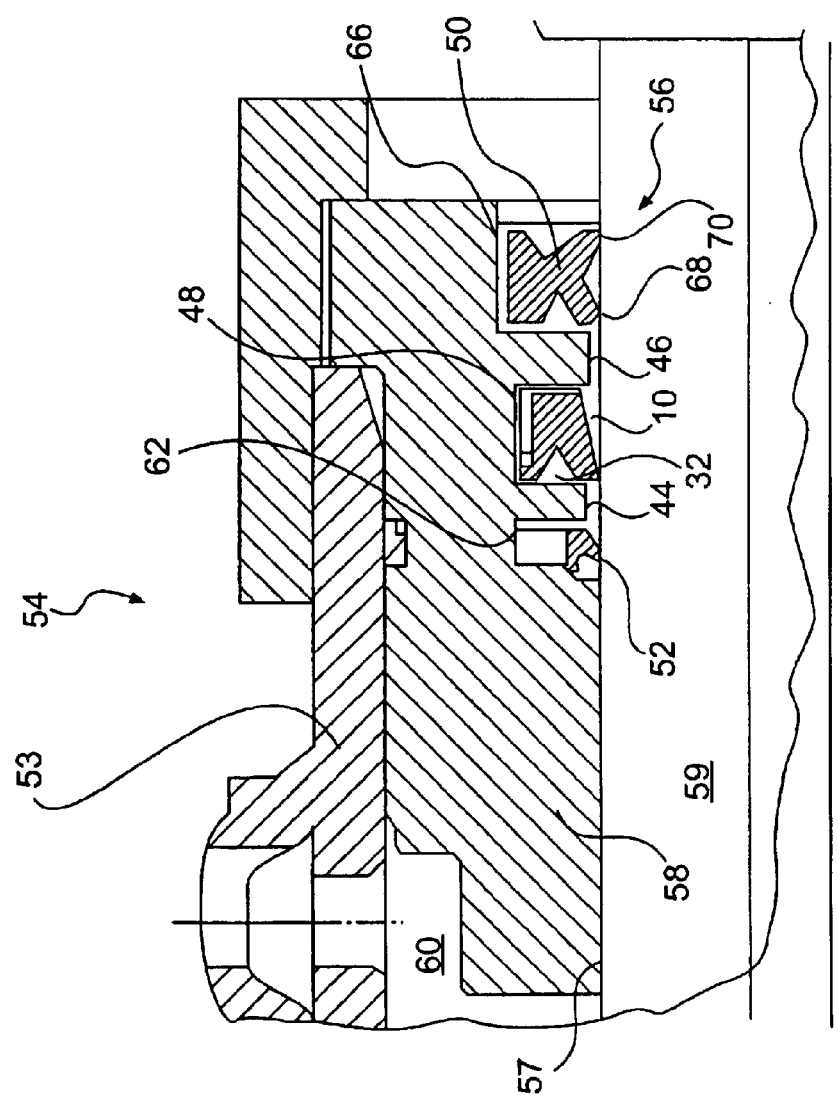
FIG. 4 is a cross-sectional view of a sealing arrangement for a hydraulic cylinder shaft in accordance with an embodiment of the present invention.

As shown in FIG. 4, seal 10 may be incorporated as part of a sealing assembly 56 for a hydraulic cylinder 54. Hydraulic cylinder 54 includes a housing 53 that defines at least one fluid chamber 60. A cylinder head 58 that has three annular grooves 62, 48, and 66 caps one end of housing 53. A cylinder rod 59 is slidably received in an opening 57 of cylinder head 58.

Sealing assembly 56 includes a buffer seal 52, seal 10, and a wiper seal 50. Buffer seal 52 is placed in first annular groove 62. Seal 10 is placed in second annular groove 48. Wiper seal 50 is placed in third annular groove 66.

Each of the buffer seal 52, seal 10, and wiper seal 50 engage a portion of the surface of cylinder rod 59 to form three separate seals. As illustrated, buffer seal 52 is positioned closest to fluid chamber 60. Wiper seal 50 is the outermost seal. Seal 10 is disposed between buffer seal 52 and wiper seal 50. A first gap 44 separates buffer seal 52 from seal 10 and a second gap 46 separates seal 10 from wiper seal 50.

In the illustrated embodiment, wiper seal 50 includes a first lip 68 and a second lip 70. First lip 68 and second lip 70 engage separate portions of the surface of cylinder rod 59. The seal formed by the engagement of second lip 70 with the surface of the cylinder rod 59 prevents dirt and debris from adhering to the surface of cylinder rod 59 as it is drawn into cylinder housing 53 and contaminating the system fluid. First lip 68 removes any fluid that adheres to the surface of cylinder rod 59 as the cylinder rod moves in cylinder head 58. Fluid removed from the surface of cylinder rod 59 collects in second gap 46.

INDUSTRIAL APPLICABILITY

The operation of the aforementioned system will now be described with reference to the attached drawings. With reference to FIG. 4, buffer seal 52, seal 10, and wiper seal 50 engage different portions of the surface of cylinder rod 59 to form three separate seals. In response to the introduction of pressurized fluid into the hydraulic cylinder 54, cylinder rod 59 slides within cylinder head 58.

The seal formed by buffer seal 52 with the surface of cylinder rod 59 creates a high pressure seal that helps to prevent the pressurized fluid from escaping cylinder head 58. However, due to the high operating pressures of the fluid within the fluid chamber 60 and the movement of cylinder rod 59, the seal created by buffer seal 52 does not retain all fluid within fluid chamber 60. Some fluid passes by buffer seal 52 and into first gap 44.

Referring to FIG. 3, inner lip 26 engages and forms a seal with the surface of cylinder rod 59. This seal provides a second barrier to prevent fluid from escaping the hydraulic actuator. Fluid is captured in first gap 44 and in groove 32 of seal 10. In certain operating conditions, such as where the pressure of the fluid in first gap 44 and in groove 32 reaches a level that is greater than the pressure of the fluid in fluid chamber 60, buffer seal 52 may allow fluid to flow from first gap 44 to fluid chamber 60. However, if the fluid in first gap 44 remains at a high pressure, some fluid will leak through seal and into second gap 46.

As shown in FIG. 4, first lip 68 and second lip 70 of wiper seal engage the surface of cylinder rod 59 to create a seal. First lip 68 prevents fluid from escaping second gap 46. Any fluid that passes by seal collects in second gap 46. It is possible in some situations for a significant amount of fluid to collect in second gap 46.

As additional fluid collects in second gap 46, the pressure of the fluid in second gap 46 becomes greater. Referring to FIG. 3, the passageway created by channel 31 allows fluid to flow into channel 28 and eventually to recess 30 of relief feature 12. The fluid that flows into relief feature 12 is at the same pressure as the fluid in second gap 46.

The pressure of the fluid in relief feature 12 creates a force that acts on outer lip 24 of seal 10 in a direction perpendicular to cylinder rod 59. As will be recognized, the size, shape, and location of relief feature 12 will impact the magnitude of the force exerted on outer lip 24. For instance, a larger relief feature that is placed close to second radial face 16 will create a greater force than a smaller relief feature that is placed further from second radial face 16.

When the force exerted on outer lip 24 by the fluid in relief feature 12 becomes greater than the force exerted on outer lip 24 by the fluid in groove 32, outer lip 24 will flex towards inner lip 26. The flexing of the outer lip 24 creates a gap between outer lip 24 and the surface of annular groove 48. Thus, when outer lip 24 flexes, fluid may flow from the relief feature 12 through the created gap and into groove 32. The fluid may then flow towards first gap 44 and be returned to the system.

Seal 10 is, therefore, a reverse-pressure actuated seal. In other words, seal 10 is actuated to allow fluid to return to the system when seal 10 is subject to a reverse pressure situation, i.e. the pressure in second gap 46 is greater than the pressure in first gap 44. One skilled in the art will recognize that the reverse pressure at which the seal is activated will depend upon the number, sizes, shapes, and locations of relief features in the seal.

In a hydraulic cylinder that uses a conventional sealing assembly, the pressure of fluid trapped between the "U-cup" seal and the wiper seal can reach levels as high as 2.8 MPa (400 psi). This pressure level may result in the wiper seal being dislodged from its annular groove. When the wiper seal is lost, the hydraulic cylinder loses its protection from dirt and debris and contamination of the operating fluid. A hydraulic cylinder that uses a sealing assembly having a "U-cup" seal with the illustrated relief features may reduce the pressure of the fluid between the "U-cup" seal and the wiper seal to approximately 0.7 MPa (100 psi). This lower pressure level is less likely to cause the wiper seal to dislodge from its annular groove. It will be understood that the pressure of the fluid between the "U-cup" seal and the wiper seal may be effectively controlled by modifying the size, shape, and number of relief features in the seal depending upon the particular application and operating conditions of the hydraulic cylinder.

Thus, the present invention has wide applications in a variety of machines incorporating hydraulic actuators. The present invention provides advantages in that it provides a reverse pressure actuated seal that will allow fluid trapped in a sealing assembly to be returned to the system and minimize the possibility of a seal being dislodged due to pressure build up.

It will be apparent to those skilled in the art that various modifications and variations can be made in the disclosed seal without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A seal for a hydraulic cylinder rod, comprising: a main body defining an opening therein and including an inner surface, an outer surface, a first radial face having a generally planar surface extending from the inner surface to the outer surface, a second radial face extending from the inner surface to the outer surface and having a groove disposed therein, the groove defining an inner lip adjacent the inner surface and an outer lip adjacent the outer surface; and a plurality of relief features disposed in the outer surface of the main body, each of the plurality of relief features including a channel formed in the outer surface and extending from the first radial face to a recess having a width larger than a width of the channel and being disposed in the outer lip of the main body, wherein a ridge separates the recess from the second radial face, the recess of each of the plurality of relief features is adapted to receive a pressurized fluid from the first radial face through the channel, and the outer lip of the main body is adapted to flex to allow a flow of pressurized fluid from the first radial face to the second radial face when the pressure of the fluid at the first radial face is greater than the pressure of a fluid at the second radial face.

2. The seal of claim 1, further including a second channel extending along the first radial face and connecting with said channel in the outer surface.

3. The seal of claim 1, wherein the main body has a substantially circular shape.

4. A hydraulic cylinder assembly, comprising:

a housing defining at least one chamber configured to hold a pressurized fluid, the housing having a head defining an opening;

a cylinder rod having a surface and disposed for sliding movement in the opening of the housing; and a seal having a main body defining an opening configured to receive the cylinder rod therein, the main body including an inner surface, an outer surface, a first radial face having a generally planar surface extending from the inner surface to the outer surface, a second radial face extending from the inner surface to the outer surface and having a groove disposed therein, the groove defining an inner lip adjacent the inner surface and an outer lip adjacent the outer surface, the inner lip configured to engage the surface of the cylinder rod, the main body further including a plurality of relief features disposed in the outer surface of the main body, each of the plurality of relief features including a channel formed in the outer surface and extending from the first radial face to a recess having a circular shape with a diameter greater than a width of the channel and being disposed in the outer lip of the main body, wherein a ridge separates the recess from the second radial face, the recess of each of the plurality of relief features is adapted to receive a pressurized fluid from the first radial face through the channel, and the outer lip of the main body is adapted to flex to allow a flow of pressurized fluid from the first radial face to the second radial face when the pressure of the fluid at the first radial face is greater than the pressure of a fluid at the second radial face.

5. The hydraulic cylinder assembly of claim 4, further including a second seal configured to engage the surface of the cylinder rod between the at least one chamber and the inner lip of said first seal and a third seal configured to engage the surface of the cylinder rod at a location where both the first and second seals engage the surface of the cylinder rod between the at least one chamber and the third seal.

6. The hydraulic cylinder assembly of claim 5, wherein the housing includes a first annular groove configured to receive the first seal, a second annular groove configured to receive the second seal, and a third annular groove configured to receive the third seal.

7. The hydraulic cylinder assembly of claim 4, further including a second channel extending along the first radial face and connecting with said channel in the outer surface.

8. The hydraulic cylinder assembly of claim 4, wherein the main body has a substantially circular shape.

9. The hydraulic cylinder assembly of claim 5, wherein the second seal is a buffer seal.

10. The hydraulic cylinder assembly of claim 5, wherein the third seal is a wiper seal.

* * * * *